(12) United States Patent
Lingmann

(10) Patent No.: US 7,392,765 B2
(45) Date of Patent: Jul. 1, 2008

(54) BIODEGRADABLE PET MAT

(75) Inventor: Terry R. Lingmann, 602 Holmes La., Oregon City, OR (US) 97045

(73) Assignee: Terry R. Lingmann, Oregon City, OR (US)

( * ) Notice: Subject to any disclaimer, the term of this patent is extended or adjusted under 35 U.S.C. 154(b) by 285 days.

(21) Appl. No.: 11/335,909

(22) Filed: Jan. 18, 2006

(65) Prior Publication Data

US 2007/0163513 A1    Jul. 19, 2007

(51) Int. Cl.
*A01K 1/01* (2006.01)
*A01K 1/015* (2006.01)
(52) U.S. Cl. ........................................ 119/526; 119/172
(58) Field of Classification Search .................. 119/526, 119/28.5, 221, 166, 170, 171, 172, 169; 5/417, 5/420
See application file for complete search history.

(56) References Cited

U.S. PATENT DOCUMENTS

| | | | | | |
|---|---|---|---|---|---|
| 2,505,176 | A | * | 4/1950 | Elder | 112/411 |
| 3,486,485 | A | * | 12/1969 | Kahanick | 119/706 |
| 3,752,121 | A | * | 8/1973 | Brazzell | 119/169 |
| 4,337,077 | A | * | 6/1982 | Smith | 405/24 |
| 4,376,422 | A | * | 3/1983 | Whitehead et al. | 119/172 |
| 4,441,453 | A | * | 4/1984 | McMickle et al. | 119/221 |
| 4,478,533 | A | * | 10/1984 | Garrett | 405/24 |
| 4,490,071 | A | * | 12/1984 | Morrisroe | 405/24 |
| 4,657,432 | A | * | 4/1987 | Rentrop et al. | 405/24 |
| 5,630,377 | A | * | 5/1997 | Kumlin | 119/172 |
| 5,785,002 | A | * | 7/1998 | Cazin | 119/223 |
| 5,871,303 | A | * | 2/1999 | Brown et al. | 405/24 |
| 5,876,151 | A | * | 3/1999 | Brown et al. | 405/52 |
| 6,079,363 | A | * | 6/2000 | MacLaine | 119/161 |
| 6,171,686 | B1 | * | 1/2001 | McNeil | 428/304.4 |
| 6,230,654 | B1 | * | 5/2001 | McNeil | 119/256 |
| 6,357,388 | B1 | * | 3/2002 | Holtrop et al. | 119/28.5 |
| 6,405,676 | B1 | * | 6/2002 | Mochizuki | 119/171 |
| 6,534,136 | B2 | * | 3/2003 | Weder | 428/34.1 |
| 7,107,933 | B2 | * | 9/2006 | Mohr | 119/166 |

* cited by examiner

*Primary Examiner*—Yvonne R. Abbott
(74) *Attorney, Agent, or Firm*—Robert J. Ireland

(57) ABSTRACT

A biodegradable absorbent mat for absorbing and containing moisture including debris from pet feet, consisting of a bottom layer formed of an organic absorbent mesh composite, a top layer affixed and overlying said bottom layer, having an alternating combination of stitched paper ruffles and helically intertwined brush fibers. The organic mesh composite may be burlap or paper, treated with starch for rigidity, and then coated with a natural gum or latex to enhance friction grip and provide a moisture barrier. The configuration of the stitched paper ruffles, provide maximum exposure of the cut linear edges of the ruffles to a pet's feet. The cut linear edges wick away moisture increasing the rate of absorbency. The stitched paper ruffles provide increased capacity for absorbency and debris containment. The helically intertwined brush fibers primarily remove debris from pet feet, and also provide a secondary function of containment of debris.

4 Claims, 1 Drawing Sheet

BIODEGRADABLE PET MAT

CROSS REFERENCES TO RELATED APPLICATIONS

Not Applicable

STATEMENT REGARDING FEDERALLY SPONSORED RESEARCH OR DEVELOPMENT

This invention is not the product of any Federally Sponsored Research or Development.

REFERENCE TO MICROFICHE APPENDIX

Not Applicable

BACKGROUND OF THE INVENTION

The invention relates to a biodegradable pet mat for absorbing moisture and containing debris from the feet of pets. In one embodiment, the mat consists of two layers, a bottom layer and a top layer. The bottom layer is formed of an organic absorbent mesh that can be treated to be rigid and non-skid when used on a smooth floor. The top layer is affixed and overlying said bottom layer, having alternating combinations of stitched paper ruffles and helically intertwined brush fibers. The stitched paper ruffles absorb moisture and contain debris, while the helically intertwined brush fibers dislodge and capture debris from the feet of pets.

The historical problem with having pets in a house is maintaining a clean environment for both the pet and human inhabitants. Pets track in moisture and debris. Pets also spill water and food, drool, and generally make a mess of their eating areas. Pets also drop body wastes when kept in a confined space. These wastes then may be carried on the pet's feet into the human living area causing sanitary and cleanliness issues.

In the case with cats, litter boxes are a constant source of maintenance and clean up, and the area around the box is beset with litter and body wastes that stick to the bottom of the cat's feet. The present invention provides for an inexpensive, biodegradable solution, that will absorb body waste moisture, dislodge litter and waste from the cat's feet, entrapping said litter, moisture, and waste into a biodegradable medium that can be disposed of in an environmentally friendly way.

One device addressing the eating area mess is a rubber mat having an irregular surface to be used as a placement mat for food and water dishes. (U.S. Pat. No. 4,907,539). This mat is not absorbent and not biodegradable. It also fails to entrap and hold drool, water, pet food, or other debris associated with pet feeding.

Another device is a rubber mat for protecting the floor of a pet confinement area having a plurality of protrusions and grooves to provide traction to pets. (U.S. Pat. No. 6,220,205). This pet area mat does not absorb moisture and fails to contain debris or other animal waste.

There are many devices used to help maintain litter box areas and aid in removing litter from the bottom of cat's feet as they exit the litter box. One such device is an artificial turf doormat that is places under the litter box to trap tracked out litter and body wastes. (U.S. Pat. No. 6,357,488). However, #488 does not absorb moisture, and body wastes can get trapped within the turf mat and under the litter box creating undesirable smells and bacteria Said trapped body wastes may pose a serious health threat for both cats and humans.

Another device designed to maintain litter box areas is a hard plastic, rubber, commercial grade carpet or combination thereof, that is placed next to the litter box. (U.S. Pat. No. 5,797,352). Again, #352 does not absorb pet waste moisture, the device only holds the litter and body waste, requiring the pet owner to manually clean and sterilize regularly.

SUMMARY OF INVENTION

The present invention is a pet area mat that is placed in areas of pet egress and ingress, including areas where pets eat, drink, sleep, or perform other bodily functions. The pet mat provides an environmentally friendly solution to keeping a home clean when shared with pets. The object of the present innovation is to provide a mat that cleans the feet of the pet as it walks across, while being constructed from organic, environmentally friendly materials, allowing for disposal by biodegradation.

The mat can be cut into any shape, and is constructed in two layers, a bottom layer and a top layer. The bottom layer is fabricated from an organic absorbent mesh that can be burlap, coconut fibers, or any other organic fiber mesh. The top layer affixes and overlays the bottom layer, said top layer dislodges debris, entraps and contains debris, and absorbs moisture.

In one embodiment, the top layer is constructed and arranged having alternating combinations of stitched paper ruffles and helically intertwined brush fibers. The stitched paper ruffles absorb moisture and contain debris, while the helically intertwined brush fibers dislodge and capture debris from the feet of pets.

In a second embodiment, the top layer is constructed solely of stitched paper ruffles to maximize moisture absorbing and debris containment.

BRIEF DESCRIPTION OF THE DRAWINGS

The proposed invention will be illustrated and better understood concerning the embodiments set forth below in the detailed description thereof. Such description makes reference to the attached drawings wherein.

DESCRIPTION OF THE PREFERRED EMBODIMENTS

Figure 1:
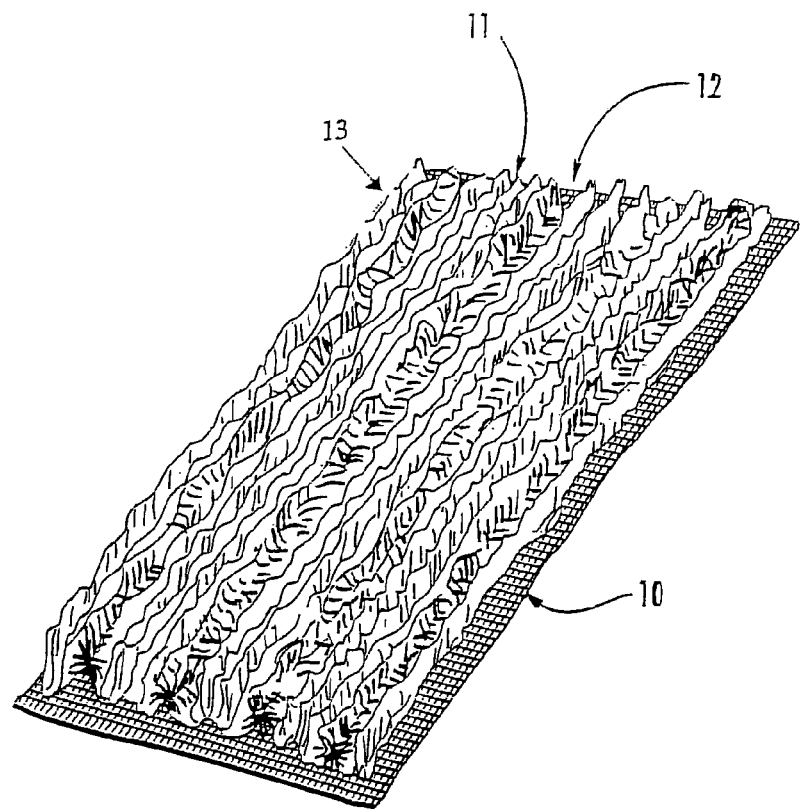
FIG. 1 is a perspective view of the preferred embodiment of the mat, constructed and arranged having a bottom layer 10 of organic absorbent mesh composite, and a top layer 13 affixed and overlying said bottom layer, having an alternating combination of stitched paper ruffles 11 and helically intertwined brush fibers 12.
Figure 2:
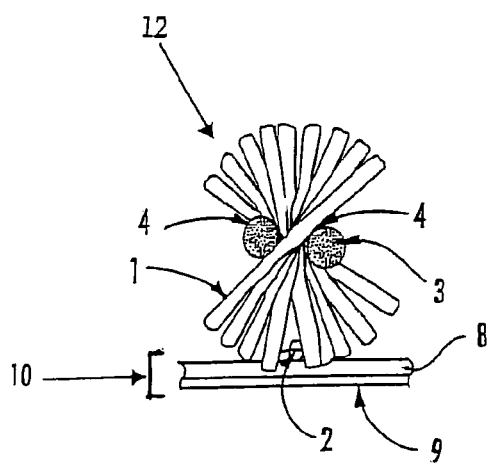
FIG. 2 is a sectional view of the mat, centered on the helically intertwined brush fibers 12, demonstrating the components and configuration of the helically intertwined brush fibers 12 as attached to the bottom layer 10, constructed in accordance with, and embracing the present invention, and which is capable of removing debris from pet's feet.
Figure 3:
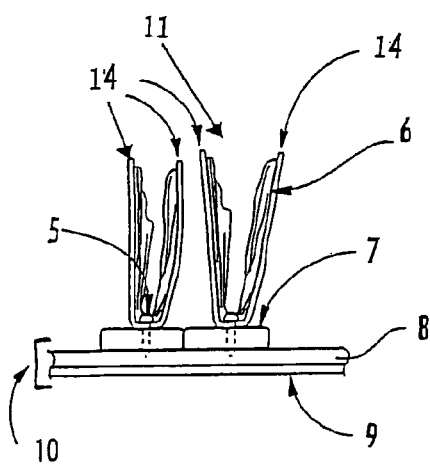
FIG. 3 is a sectional view of the mat centered on one of the 11 stitched paper ruffles, demonstrating the components and configuration of the 11 stitched paper ruffles as attached to the 10 bottom layer, constructed in accordance with and embracing the present invention, and which is capable of absorbing moisture and entrapping debris from pet's feet.

Referring now to the drawings, and particularly to FIGS. 1-3, a preferred embodiment of the present invention, is shown and generally described.

Description FIG. 1:

FIG. 1 is a perspective view of the preferred embodiment of the biodegradable mat in a rectangular shape, constructed and arranged having a bottom layer 10 of organic absorbent mesh composite, and a top layer 13 affixed and overlying said bottom layer. The top layer 13 consists of an alternating combination of stitched paper ruffles 11 and helically intertwined brush fibers 12. The top layer 13 may also be constructed using only stitched paper ruffles 11. The bottom layer 10 is a composite of a fiber mesh treated with any other material to create a desired effect.

Description FIG. 2:

FIG. 2 is a sectional view of the preferred embodiment of the mat, centered on the helically intertwined brush fibers 12. The helically intertwined brush fibers 12 consist of organic fibers 1 such as jute, small organic twine 3 such as hemp, and a fiber adhesive 4 such as gum rubber or latex. During assembly, the organic fibers 1 are positioned linearly in a row side by side, the organic twine 3 is treated with the fiber adhesive 4, and then one strand of the treated organic twine 3 is placed perpendicular and centered along the organic fibers 1, and a second strand of organic twine 3 is placed on the opposite side of the first strand perpendicular and centered on the linear row of organic fibers 1. Once adhesion is accomplished between the organic fibers 1 and the organic twine 3, said combination is then twisted from the ends to form a strand of helically intertwined brush fibers 12. Said helically intertwined brush fibers 12 are then attached to the bottom layer 10. Said attachment to the bottom layer 10 can be accomplished using a linear run of adhesive 2.

The bottom layer 10 may consist of a fiber mesh 8 of burlap treated with starch to increase rigidity, and/or coated with a natural gum product 9 to enhance grip friction and provide a moisture barrier between the mat and the floor.

The bottom layer 10 may consist of a fiber mesh 8 of paper fibers treated with starch to increase rigidity, and/or coated with a natural gum product 9 to enhance grip friction and provide a moisture barrier between the mat and the floor.

Description FIG. 3:

FIG. 3 is a sectional view of the preferred embodiment of the mat centered on two rows of the stitched paper ruffles 11. The stitched paper ruffles 11 are constructed from biodegradable paper 6. During assembly, the biodegradable paper 6 is cut into linear lengths, and then folded in half at stitching line 5. The biodegradable paper 6 is then compressed in the linear direction causing folds and ruffles and forming parallel cut linear edges 14 being serrated in shape. Once compressed, the biodegradable paper 6 is sewn along the stitching line 5, through an adhesive backing strip 7, and finally through the fiber mesh 8. Before or after sewing, a natural gum product 9 to enhance grip friction and provide a moisture barrier may be applied. The process is duplicated for each row of stitched paper ruffles 11. The cut linear edges 14 have a high absorbancy rate due to the cut edge having a wicking effect when in contact with moisture. "Wicking" is defined as a piece of material that conveys liquid by capillary action. The moisture is absorbed along the cut linear edge 14 and wicked into the paper. This allows moisture to absorb faster than along the uncut sides of the biodegradable paper 6.

The ruffled and folded rows substantially increase the surface area of the stitched paper ruffles 11, thereby increasing the capacity of the stitched paper ruffles 11

What is claimed is:

1. A biodegradable absorbent mat for absorbing moisture and containing debris from pet feet, consisting essentially of:
   a bottom layer formed of an organic absorbent mesh composite;
   a top layer affixed and overlying said bottom layer, having an alternating combination of stitched paper ruffles and helically intertwined brush fibers;
   said organic absorbent mesh composite is treated with biodegradable starch to increase rigidity.

2. A biodegradable absorbent mat for absorbing moisture and containing debris from pet feet, consisting essentially of:
   a bottom layer formed of an organic absorbent mesh composite;
   a top layer affixed and overlying said bottom layer, having an alternating combination of stitched paper ruffles and helically intertwined brush fibers;
   said organic absorbent mesh composite is treated with biodegradable natural gum product to enhance friction grip against smooth surfaces.

3. A biodegradable absorbent mat for absorbing moisture and containing debris from pet feet, consisting essentially of:
   a bottom layer formed of an organic absorbent mesh composite;
   a top layer affixed and overlying said bottom layer, having stitched paper ruffles;
   said organic absorbent mesh composite is treated with biodegradable starch to increase rigidity.

4. A biodegradable absorbent mat for absorbing moisture and containing debris from pet feet, consisting essentially of:
   a bottom layer formed of an organic absorbent mesh composite;
   a top layer affixed and overlying said bottom layer, having stitched paper ruffles;
   said organic absorbent mesh composite is treated with a natural gum product to enhance friction grip against smooth surfaces.

* * * * *